Aug. 20, 1935.                    F. C. MOCK                     2,012,086
                          INTERNAL COMBUSTION ENGINE
                          Filed Sept. 3, 1931          9 Sheets-Sheet 3

INVENTOR.
Frank C. Mock
BY
J. B. Smith
ATTORNEY.

Aug. 20, 1935.   F. C. MOCK   2,012,086
INTERNAL COMBUSTION ENGINE
Filed Sept. 3, 1931   9 Sheets-Sheet 5

INVENTOR.
Frank C. Mock
BY
F. B. Smith
ATTORNEY.

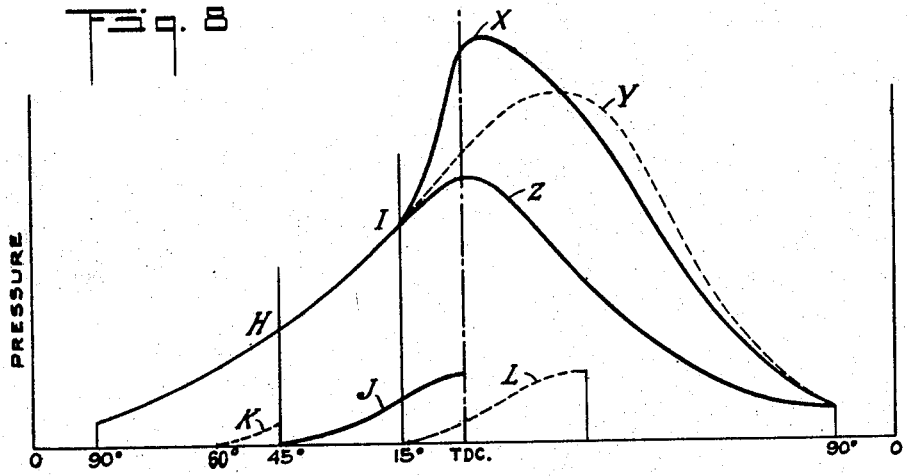
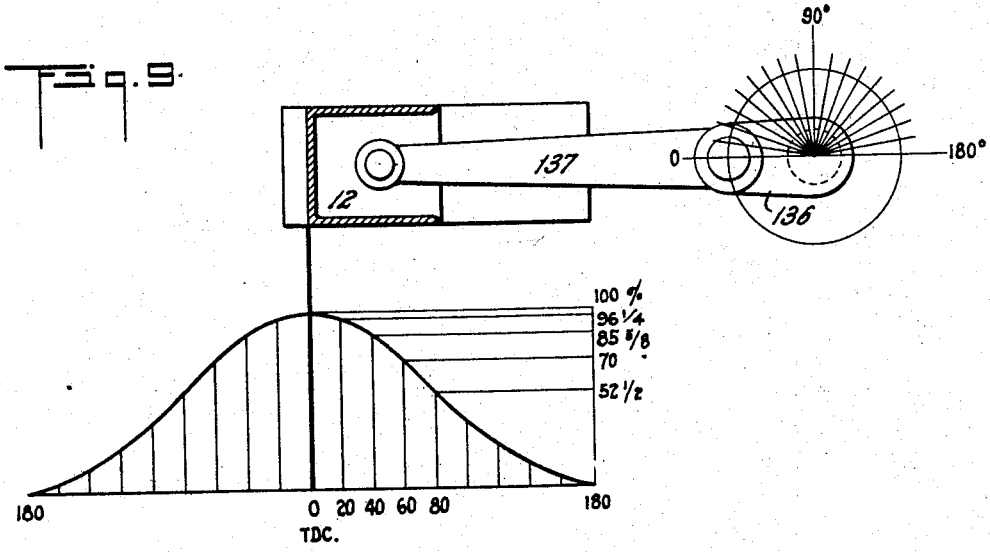

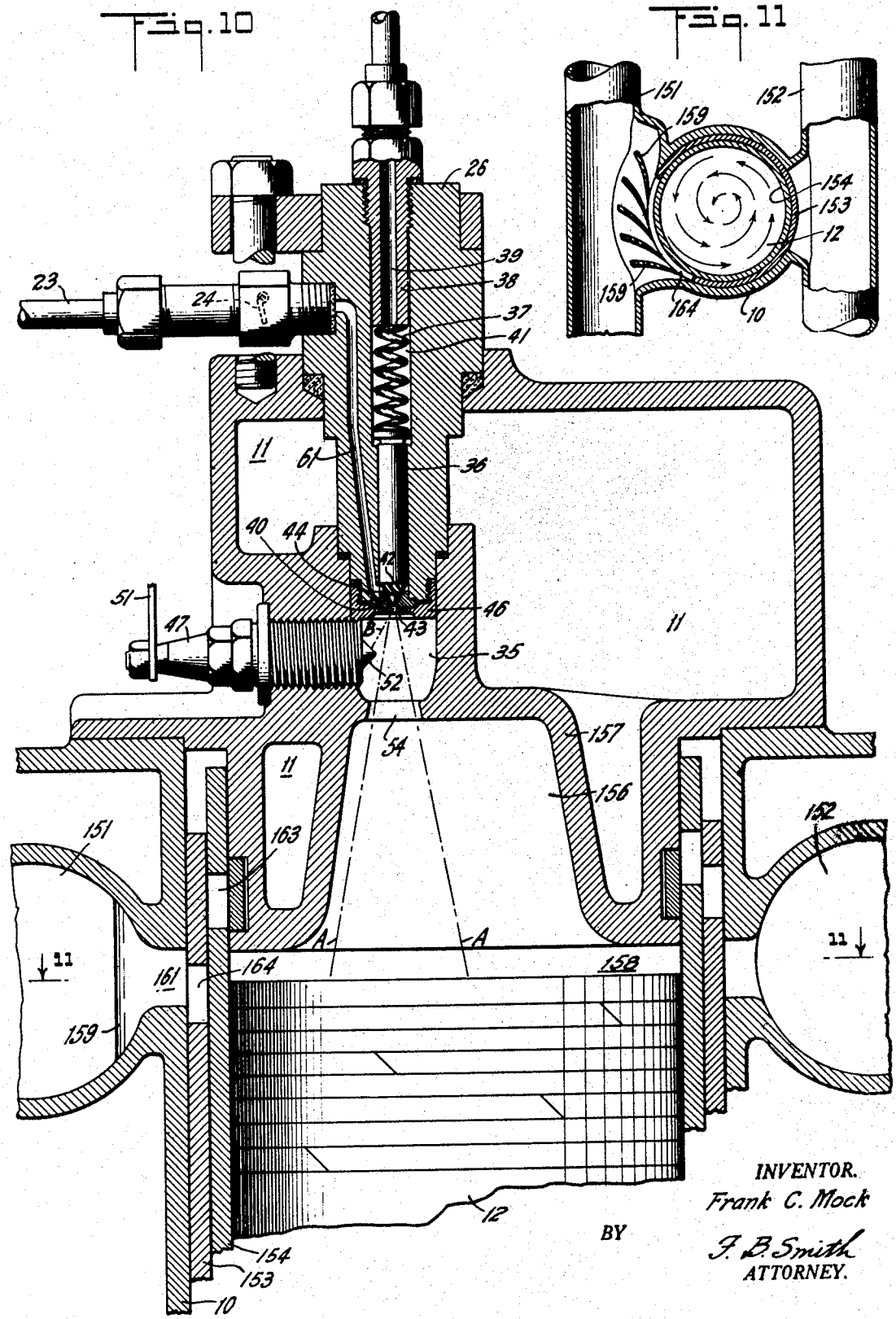

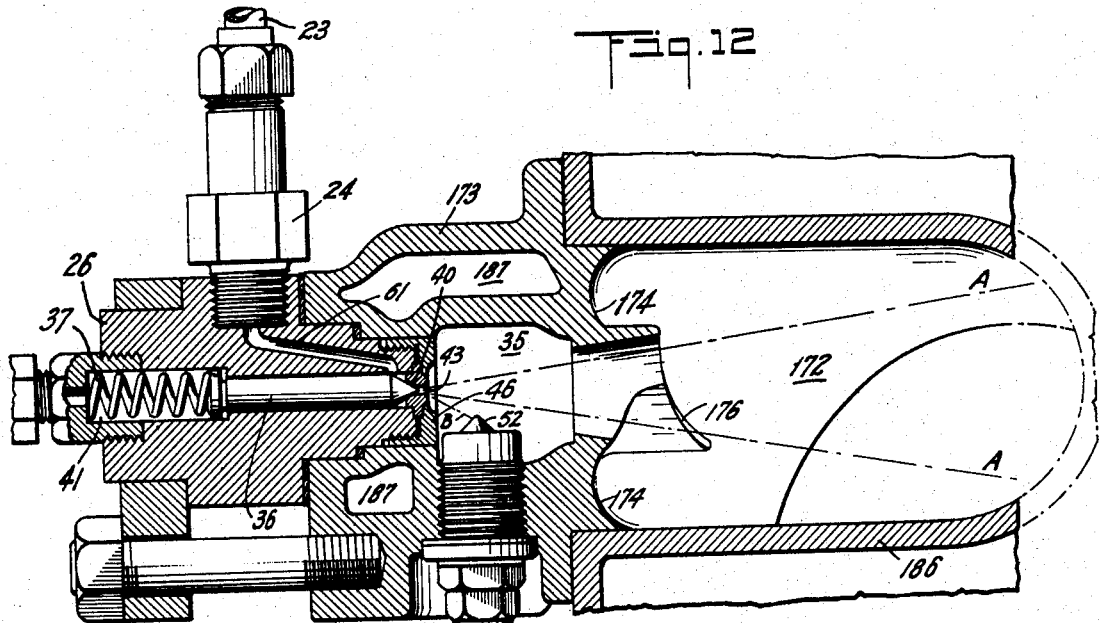
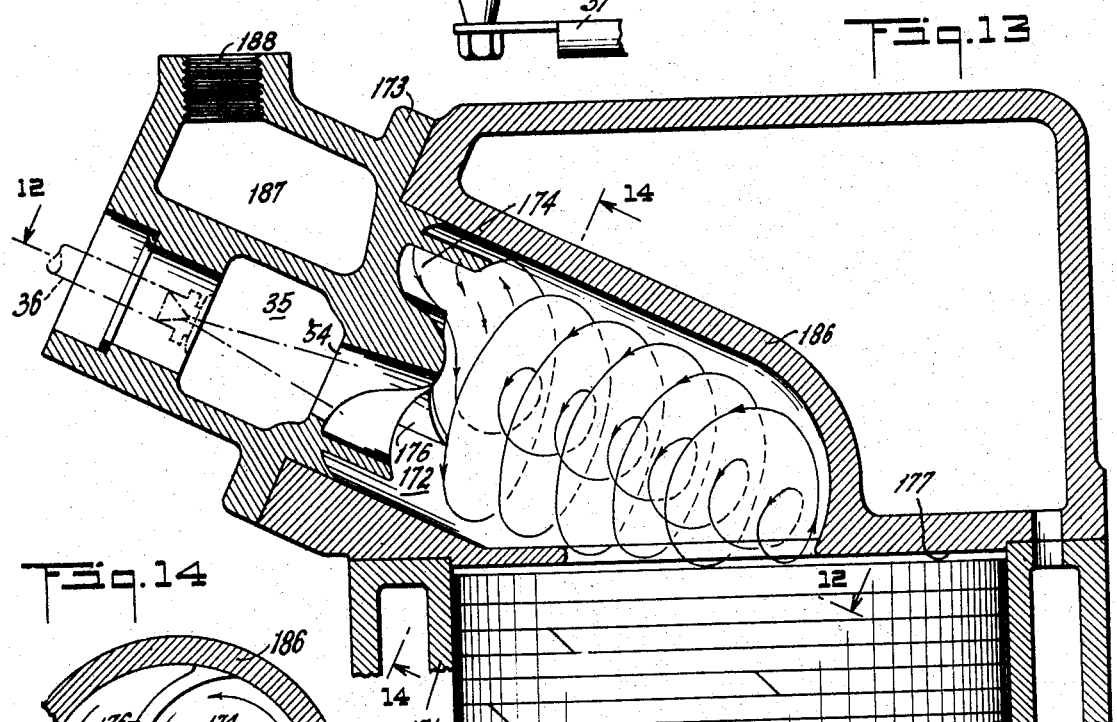
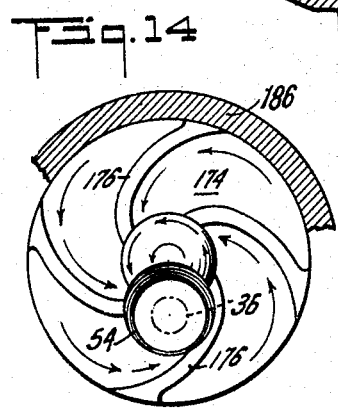

Aug. 20, 1935.　　　　F. C. MOCK　　　　2,012,086
INTERNAL COMBUSTION ENGINE
Filed Sept. 3, 1931　　　9 Sheets-Sheet 9
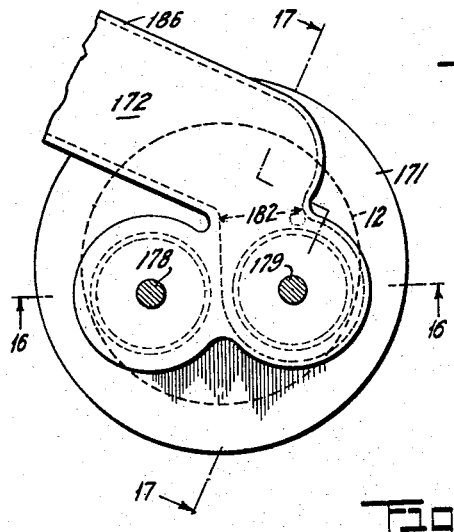
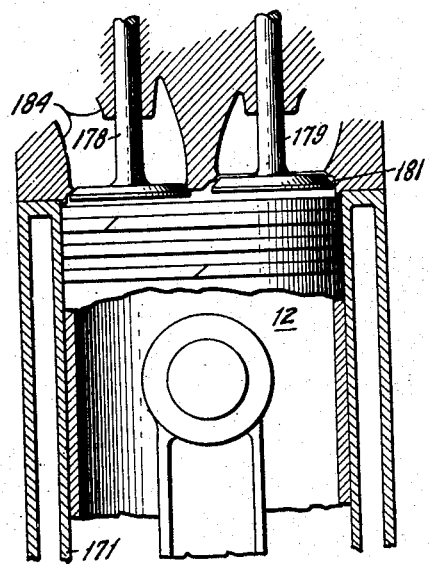
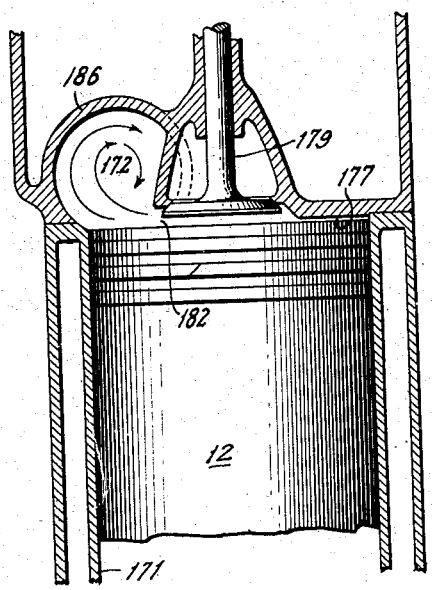
INVENTOR.
Frank C. Mock
BY F. B. Smith
ATTORNEY.

Patented Aug. 20, 1935

2,012,086

UNITED STATES PATENT OFFICE 2,012,086

INTERNAL COMBUSTION ENGINE

Frank C. Mock, Montclair, N. J., assignor, by mesne assignments, to Eclipse Aviation Corporation, East Orange, N. J., a corporation of New Jersey Application September 3, 1931, Serial No. 561,067

13 Claims  (Cl. 123—32)

This invention relates to engines, and more particularly to a method and a means for controlling the burning of the fuel charge in internal combustion engines.

Observation of fuel injection having compression ignition engines shows that the ignition of the fuel does not occur immediately after the start of the injection and that a definite time interval, known as ignition lag, occurs between the start of injection and the beginning of the pressure rise due to combustion.

Pressure diagrams or indicator cards taken from Diesel type engines show that, contrary to expectation, the rate of pressure rise is not controlled by the rate of fuel injection. In the light of present day knowledge, this is easily understood, for by the time that the first particles of fuel are ignited, a large part of the injection has been accomplished; and as these first particles burn, they raise the pressure and temperature of the remaining charge, more recently injected, to a point where its ignition lag is very much reduced; so that the last particles injected produce an abrupt rise in the pressure curve.

Another well known problem with the Diesel fuel injection engine relates to the difficulty of bringing all of the fuel particles into intimate contact with the oxygen molecules of the air charge, and ordinarily the air charge is more than twice that necessary for complete combustion. It is therefore easily seen that if the fuel and air could be more completely mixed, each particle of fuel can be ignited and brought into intimate contact with its share of oxygen, and thereby the total size of the engine cylinder may be greatly reduced.

Many devices for intimate mixing have been tried in the past, but their effect has generally been accompanied by an increase in ignition lag and a very rapid pressure rise thereafter, partly due to the higher compression pressures made necessary by increased difficulty of igniting a turbulent charge.

In dealing with the foregoing difficulties, it has been found that ignition is more easily started in a charge of comparatively calm air, but when once started is very easily maintained. If fuel be injected into the combustion chamber through or adjacent to a previously created body of flame, its ignition is so immediate that the pressure rise of combustion may to a great extent be controlled by the rate of fuel injection. It has further been found that when the particles of fuel are injected through flame, a much higher velocity of air swirl for mixing the fuel and air may be used, and also that there is a decreased fuel penetration that permits the use of smaller cylinders.

Although a higher velocity swirl may be used, it may be desirable to so inject the fuel that it emerges from the flame chamber into a part of the air swirl having the lowest velocity and progressively crosses stream-lines of increasing velocity. A convenient way of accomplishing this result is to direct the air swirl from the outside of the chamber toward the center, inject the fuel into the more slowly moving core, and direct it through the core into the rapidly moving air stream adjacent the outer walls of the combustion chamber.

One of the objects of the present invention is to provide an engine in which ignition lag is materially reduced.

Another object of the invention is to provide an internal combustion engine in which the maximum pressure is reduced.

Another object of the invention is to provide an engine having a more gradual rise of combustion pressure.

Another object of the invention is to provide an internal combustion engine in which the fuel particles are completely burned during a comparatively short travel.

Another object of the invention is to reduce the total combustion time of the fuel and to reduce the ratio of air to fuel to somewhere near the minimum required for complete combustion.

Another object of the invention is to provide an internal combustion engine in which the main fuel charge is introduced through a previously established flaming mixture.

Another object of the invention is to inject ignited fuel particles into a swirl of compressed air.

Another object of the invention is to provide an engine in which, as the fuel charge is reduced, the proportion of total fuel injected into the air swirl is reduced.

In one desirable embodiment of the invention, the engine is characterized by having a flame chamber into which a small preliminary charge of fuel is injected and ignited either by the heat of compression or by an ignition device such as a spark plug or heated glow plug. The flame chamber preferably contains compressed air in a comparatively calm state and is in communication with the engine cylinder or expansion chamber through an intermediate combustion chamber in which the compressed air is given a directional swirl by some means such as a formed piston, or the location and direction of the intake ports. Ignition of the preliminary charge occurs in the flame chamber, and the main charge is preferably injected through the flaming mixture from whence it emerges into the air swirl as a mass of ignited fuel particles or globules.

Other objects and features including means of injecting the fuel charges, means for obtaining the air swirl, novel timing arrangements, ignition means, means for shielding the flame chamber, and other features will be apparent from the following description of certain embodiments of the invention which are illustrated in the accompanying drawings, in which:

Fig. 8 is a diagrammatic view illustrating the difference in pressure characteristics between an engine constructed in accordance with the present invention and an engine of the prior art;

Fig. 9 is a diagrammatic view showing the relation of piston movement to crank rotation;

Fig. 10 is a sectional elevational view of a sleeve valve engine embodying the principles of the invention;

Fig. 11 is a sectional plan view of the engine illustrated in Fig. 10, drawn to a somewhat smaller scale and taken on the line 11—11 of Fig. 10.

Fig. 12 is a plan sectional view of a somewhat different form of the invention as applied to a valve-in-the-head engine and taken along the lines 12—12 of Fig. 13;

Fig. 13 is a vertical section or view of the engine illustrated in Fig. 12 and showing the angular arrangement of the combustion chamber with respect to the piston;

Fig. 14 is a view of the combustion chamber head taken on the line 14—14 of Fig. 13;

Fig. 15 is a somewhat diagrammatic plan view of the engine head illustrating the lateral displacement of the combustion chamber;

Fig. 16 is a sectional elevational view taken on the line 16—16 of Fig. 15; and, Fig. 17 is a sectional view taken on the line 17—17 of Fig. 5.

As previously stated, ignition lag is detrimental to the satisfactory operation of Diesel engines, and this lag may be reduced by the injection of a preliminary charge into a relatively calm air charge which acts as an ignition nucleus for igniting the main fuel charge that is subsequently injected through the flame created by the injection of the preliminary charge.

Figure 1:
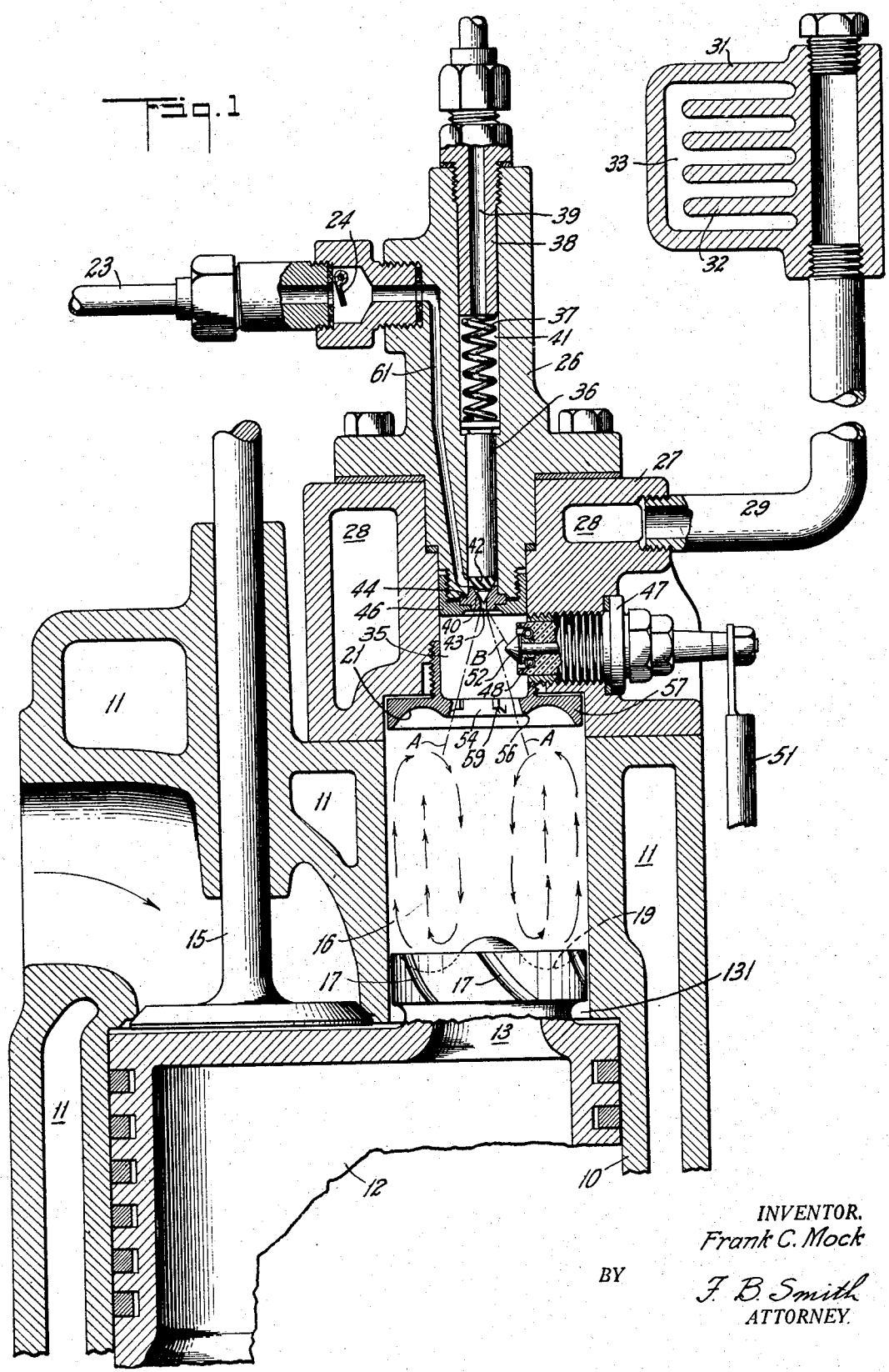
Fig. 1 is a sectional elevational view of a portion of an internal combustion engine constructed in accordance with the invention.

In Fig. 1, an engine has been shown which is constructed in a manner to reduce the ignition lag by the inclusion of a flame chamber and a combustion chamber in which the compressed air is directed in the form of a swirl and through which the main fuel charge is projected as flaming particles previously ignited in their passage through the flame chamber. 10 is the engine cylinder having water jacket 11 and within which reciprocates piston 12 having a projection 13 extending within the combustion chamber 16 at the end of the compression stroke. On the suction stroke of the engine, air is admitted through inlet valve 15 which, on the following upward stroke, is compressed between the piston 12 and the head of the cylinder 10 and which, at substantially the dead center position, is injected at high velocity through the helical grooves 17 into the combustion chamber 16. The upper surface of projection 13 preferably has the form of an annular groove 19 having a cross-section of substantially hemispherical form which coacts with a similar groove 21 at the top of the combustion chamber 16 to impart a whirling motion to the compressed gases in the direction of the arrows, of somewhat the shape of a torus and which revolves as a whole about the vertical axis of the combustion chamber by reason of the helical baffles 17. Rotation of the torus as a whole aids in producing a homogeneous mixture in cases wherein the fuel cone is unsymmetrical, as for instance when the fuel valve is not concentric with the fuel orifice.

Fuel is introduced into the engine by pipe 23 having a check valve 24 incorporated therein and threaded or otherwise secured in the injector housing 26, that is, secured by any desirable means to detachable head 27 having cooling passages 28 that are preferably filled with some fusible salt or a high boiling point liquid. The passages 28 are connected by pipe 29 to a heat exchanger 31 having fins 32 enclosed in a chamber 33 preferably having communication with the water passages 11, whereby the fusible salt or liquid may be cooled.

Under some conditions, satisfactory operation may be secured by connecting cooling passages 28 directly with the water cooling system of the engine, but it is preferred to have the flame chamber 35 at a comparatively high temperature, and for this reason, it is believed that the cooling of the chamber by a fusible salt gives more satisfactory results.

Within the injector body 26 is a valve 36 urged to its seated position by spring 37 that coacts between the upper end of the valve and the lower face of tube 38, having a passage 39 therein that acts as a relief or drainage opening for the chamber 41. Valve 36 has its lower end preferably of conical form and is provided with helical baffles 42 that impart a whirling motion to the injected fuel issuing from orifice 43 in the direction of the lines A—A.

Removable valve seat 44 is held in position on the housing 26 by a threaded cap 46 and preferably has a very small groove scratched or otherwise formed in its conical seat, through which the preliminary charge of fuel is directed along line B toward glow plug 47, which has a resistance coil 48 heated from a source of current supplied through a conductor 51 connected with any suitable source of current (not shown).

Glow plug 47 preferably has its heating coil 48 shielded from the direct impact of the preliminary charge of fuel by shield 52, the plug being preferably located in flame chamber 35 having a communicating opening 54 with the combustion chamber 16 and shielded from the whirling gases therein by an inwardly projecting lip 56 formed in the removable head member 57, preferably having a plurality of projections 59 arranged in the path of the conical fuel spray indicated at A—A. The fuel is preferably delivered to the engine in two successive steps, including a small preliminary spray and a subsequently delivered main spray, both of which are forced to the flame chamber 35 from pipe 23 through a conduit 61, terminating at the conical end of fuel valve 36.

Figure 2:
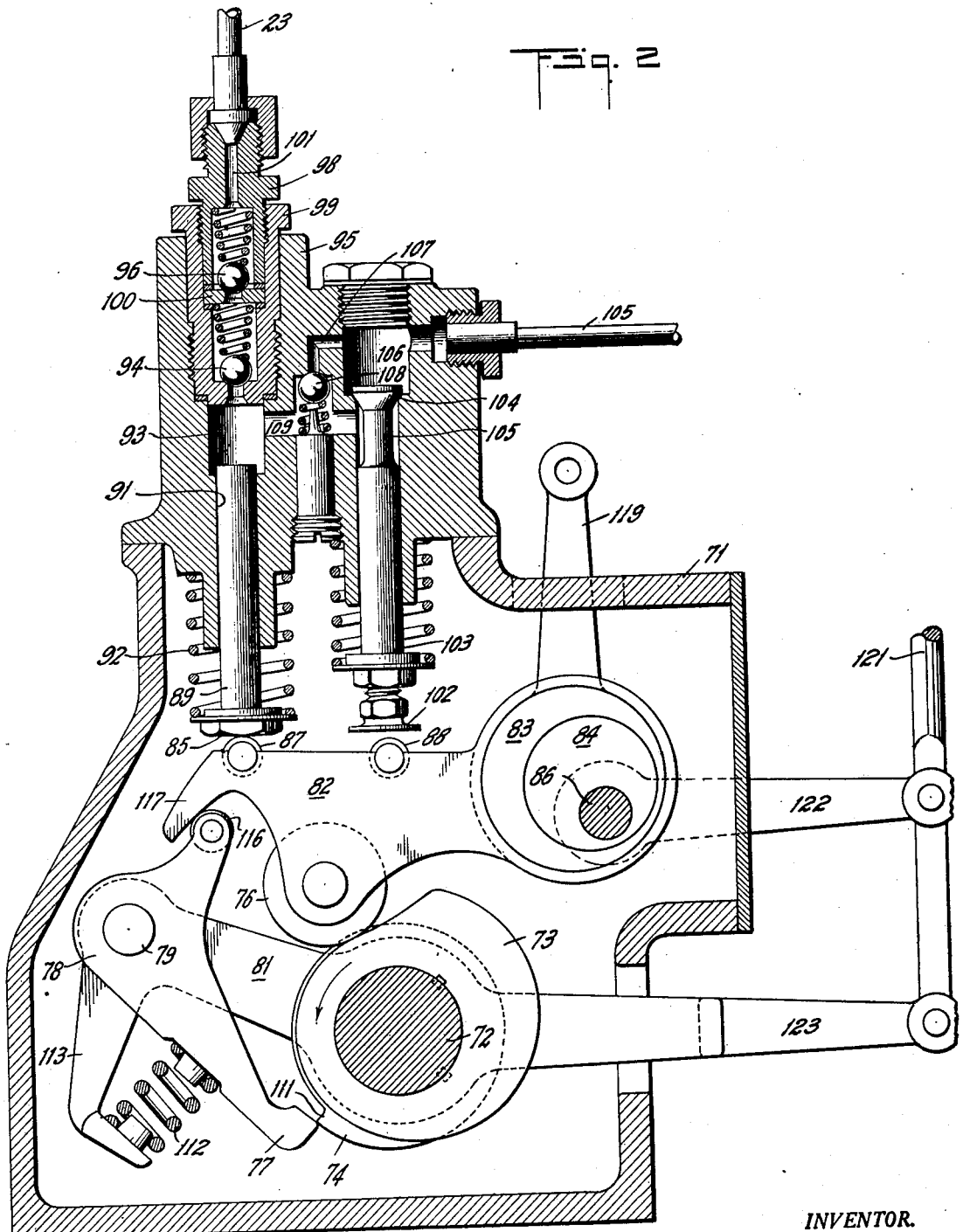
Fig. 2 is a sectional view of a fuel pump which may be used in connection with an internal combustion engine to deliver fuel to the engine in accordance with the principles herein set forth.

Any suitable means of delivering fuel in successive steps may be used in connection with the engine illustrated in Fig. 1; such a pump particularly adaptable to the purpose is illustrated in Fig. 2, which comprises a casing 71 having an engine driven cam shaft 72 rotatably mounted therein and provided with two offset cams 73 and 74 that contact respectively with roller 76 and the end 77 of bell crank 78, pivotally mounted at 79 on lever 81 that is rotatably mounted upon cam shaft 72. Roller 76 is secured in a bifurcated portion of operating lever 82, rotatable about eccentric 83, which in turn, is rotatable about a second eccentric 84 rotatable about journal 86 Rollers 87 and 88 have their journals in opposite sides of the bifurcated levers 82 and are preferably secured therein by having the upper edge of lever 82 formed with depressions of slightly greater depth than a semi-circle, the journals being forcibly pressed into the depressions which, due to the inherent resiliency of the metal, spring back into place after the journals have been forced therein to hold them in position. Roller 87 contacts with the face 85 of fuel plunger 89 slidable in cylinder 91 and urged downwardly by spring 92. A fuel chamber 93 is formed at the upper end of cylinder 91, within which the plunger 89 reciprocates to force fuel through the check valves 94 and 96, preferably arranged in tandem to guard against the danger of one of the valves being unseated because of dirt or other substance. Valves 94 and 96 are preferably located in concentric fittings 98 and 99, having valve seat 100 clamped therebetween. Fitting 98 has an outlet passage 101 formed therein through which oil is discharged to pipe 23 leading to the injection valve 36.

Roller 88 is located immediately below and adapted to contact with adjustable cap 102 threaded on the lower end of relief valve 103 having a conical seat 104 and a reduced neck 105.

In the operation of the pump, downward movement of plunger 89 to the position shown in Fig. 2 causes fuel to be drawn from any suitable source of supply (not shown), through pipe 105 into chamber 106, and through passage 107 past check valve 108 into fuel chamber 93, by way of passage 109. Assuming that the engine is running, cam shaft 72 is turned in the direction of the arrow and lever 82 is rotated in a clockwise direction by the contact of cam 73 with roller 76. The movement of lever 82 brings roller 87 into contact with plunger 89 and forces it upwardly to discharge fuel into the engine through pipe 23 until roller 88 contacts with cap 102, at which point valve 103 is raised and the pressure within fuel chamber 93 is relieved through passage 109, and the fuel passes to the inlet side of the pump, past the conical seat 104.

The above described operation of the pump relates to the manner of injecting the main spray, but as has been repeatedly pointed out before, the phenomenon of ignition lag prevents the efficient operation of an engine with only a main spray, and for this reason it is preferred to inject a preliminary spray prior to the injection of the main spray.

In the pump illustrated in Fig. 2, this is accomplished by the cam 74 which rotates bell crank 78 in a clockwise direction until the nose 111 of cam 74 passes the end 77 of bell-crank lever 78, at which point the bell-crank is abruptly turned in a counterclockwise direction by spring 112 coacting between the lever 78 and the arm 113 forming a part of the lever 81. The upper end of bell-crank 78 is provided with a roller 116 contacting with arm 117 formed on the lever 82 by which lever 82 is abruptly turned in a clockwise direction to reciprocate plunger 89 prior to the main movement induced by cam 73. The height of cam 74 is magnified somewhat in the drawings in order to better illustrate the principle of operation, and in a satisfactory construction of the pump cam 74 is of the order of one-tenth the height of cam 73. The duration of injection of the main spray is controlled by lever 119 secured to eccentric 83, rotation of which, in a clockwise direction, decreases the clearance between roller 88 and cap 102, which results in relief valve 103 being opened earlier in the cycle, and a smaller charge of fuel is delivered to the engine. Rotation of lever 119 in a counterclockwise direction increases the clearance between roller 88 and the valve, and the fuel charge is increased because of the later opening of the relief valve.

The time of injection is controlled by rod 121, preferably secured to both levers 122 and 123. Lever 122 is integral with eccentric 84, and clockwise rotation of the eccentric moves roller 76 toward the nose of cam 73 and advances the time of injection. The bodily movement of lever 82 to advance the injection causes roller 87 to assume a slightly different position with respect to valve 89, but this is immaterial as the inception point of the injection is governed entirely by the upward movement of the plunger and the duration of the injection is governed by the opening of the relief valve 103 which, by a proper arrangement of eccentrics, will remain substantially unchanged, but nevertheless any change in position may be readily corrected by manipulation of the separately operable lever 119.

Lever 123, which is also connected to rod 121, is preferably formed as an integral part of lever 81 rotatably mounted on cam shaft 72. Downward movement of rod 121 not only moves lever 82 to advance the time of the main spray injection but also rotates lever 81 in a clockwise direction and advances bell-crank lever 78 with respect to cam 74, but at a much greater rate, for the movement of lever 82 is governed by the ratio of lever 122 to the amount of eccentricity and position of eccentric 84, and the movement of bell-crank 78 is controlled by the ratio of the length of lever 123 to the length of the arm represented by the distance between cam shaft 72 and the pivotal point 79.

It is pointed out in the pump illustrated in Fig. 2 that the duration of the main injection is a function of the movement of cam 73, but that the duration of the preliminary injection is unaffected by cam movement and is controlled entirely by the time required for spring 112 to force plunger 89 to its upward position or, in other words, the duration of the main injection occurs throughout a constant angular movement and the duration of the preliminary injection occurs throughout a constant time interval. This feature of the invention will be more fully described in connection with the diagrammatic charts illustrated in Figs. 5, 6, and 7, which are hereinafter used in the description of the operation of the engine as a whole.

Referring again to Fig. 1, the preliminary movement of the pump produces a pressure rise in passage 61 and causes a small amount of fuel to be injected through groove 40 into flame chamber 35 and toward deflector 52 of the glow plug 47, which is heated by resistance coil 48, receiving its current supply from conductor 51.

It is assumed that, prior to the injection of the preliminary spray, a charge of air has been received through inlet valve 15 into the expansion chamber defined by piston 12 and cylinder 10, and compressed in a manner to force substantially the whole charge past the projecting member 13 and into the combustion chamber 16, wherein it revolves in the form of a modified torus as shown by the arrows of Fig. 1 and continues its movement for some time after the force initiating it has been removed.

The compressed air within flame chamber 35 is comparatively calm because of projecting lip 56, and the preliminary spray is easily ignited by virtue of the heat of compression and the assistance of the glow plug 47. The initial charge is subject to the ignition lag phenomenon, as previously described in regard to the main spray, and the charge does not break into flame for a short interval of time after injection, although it continues to burn for some time after the injection has ceased.

At some time subsequent to the ignition of the preliminary spray, the pressure rise of the fuel, due to action of cam 73, is sufficient to lift valve 36 from its seat and to inject the fuel in the form of a whirling hollow cone through the previously established flame in the chamber 35, and to inject it as flaming particles into the core of the whirling air torus in the combustion chamber 16. Although particles of fuel are comparatively hard to ignite in an air swirl of high velocity, when the ignition is once started it has a tendency to continue, notwithstanding an increase in the velocity of the whirl, but to guard against any danger of the flaming particles being extinguished as they emerge from the flame chamber, it is preferred to first introduce the particles in the comparatively slowly moving air at the interior or core of the torus and to cause them to progressively cross the stream-lines of increased velocity and to finally come in contact with the rapidly moving air that is forced into the combustion chamber 16 at the walls of the chamber.

The ignition of the main spray preferably occurs at or before the dead center position of the engine, and upon downward movement of piston 12 on its power stroke, the entire charge of burning mixture within the combustion chamber 16 will be projected through the opening 131 into the cylinder 10 forming the expansion chamber, and whatever particles of fuel have not been consumed in the combustion chamber will be projected as flaming particles directly into the expansion chamber, wherein the combustion will proceed without interruption and preclude the deposition of unburned fuel on the piston or cylinder walls.

Figure 5:
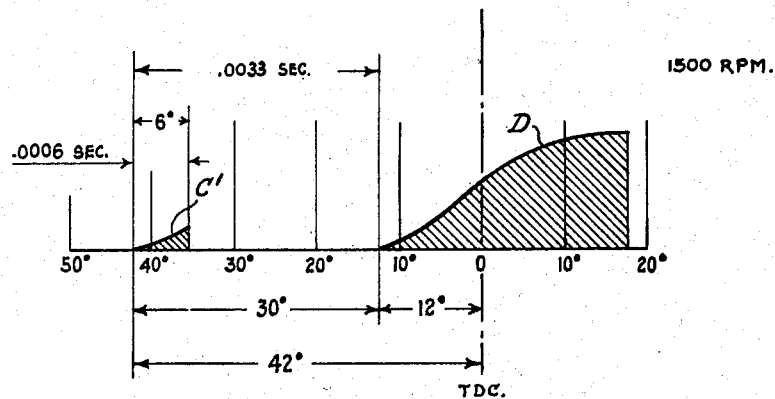
Fig. 5 is a diagrammatic view illustrating the principle of fuel injection involved herein.
Figure 6:
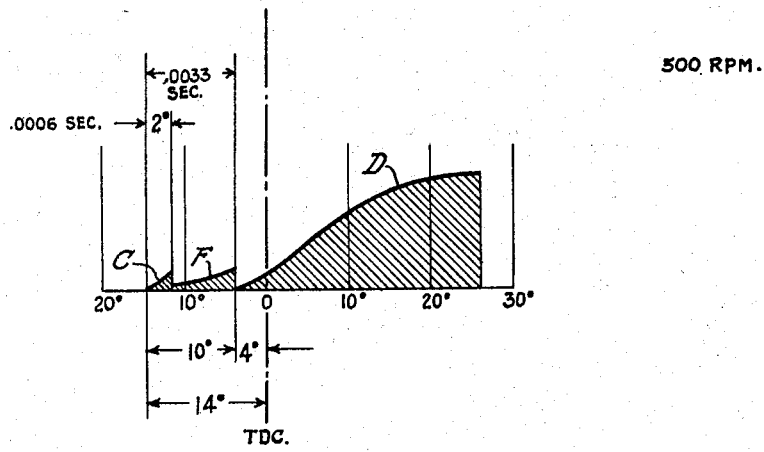
Fig. 6 is a view similar to Fig. 5 illustrating fuel injection at a lower engine speed.
Figure 7:
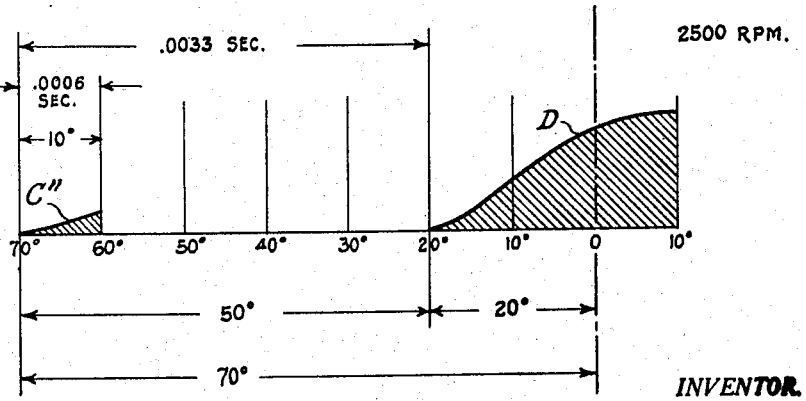
Fig. 7 is still another diagrammatic view illustrating the fuel injection at a higher engine speed.

The operation of the engine will possibly be better understood by referring to diagrammatic Figs. 5, 6, and 7, and with particular reference to Fig. 6, in which the small hatched triangle C at the left side of the figure represents the preliminary fuel injection and the hatched area D represents the main injection. In this figure, it is assumed that the engine is running at a speed of 500 R. P. M. and that the pump used to feed the engine is the one illustrated in Fig. 2.

It will be noted that the preliminary fuel injection is started fourteen degrees before top dead center and continues for two degrees of engine rotation, which is the angular equivalent of the constant time interval of .0006 second at this engine speed. The ignition phenomena hereinbefore described insure that when the preliminary charge is once ignited, it will continue for an extended time and the flame will remain in the flame chamber of the engine subsequent to the introduction of the fuel. At 500 R. P. M., a satisfactory point at which the main fuel may be introduced is four degrees before top center, and at this point the fuel is injected through the previously established flame in the flame chamber 15 and the injection continues for a total of thirty degrees, or twenty-six degrees after top dead center.

In Fig. 5, assuming that the same pump is used with an engine speed of 1,500 R. P. M. and that it is desirable to advance the time of main injection to twelve degrees before top center, the time of injection of the preliminary spray will also be advanced, but at a greater rate of advance; that is, while the main spray has been advanced only eight degrees from the position shown in Fig. 6, the preliminary charge has been advanced twenty-eight degrees. It will be noticed in Figure 5 that triangle C' has increased in length to six degrees, this increase being due to the construction of the pump illustrated in Fig. 2, in which the duration of preliminary injection is over a constant time interval of .0006 second, which corresponds to annular movement of six degrees at 1,500 R. P. M. The ignition lag, as nearly as can be ascertained by experiment, is also of a function of time and flame duration extending over a constant time interval regardless of engine speed. The advance in preliminary injection is shown as .0033 second in Figs. 5, 6, and 7, which corresponds to an angular movement of thirty degrees at 1,500 R. P. M., as opposed to an angular movement of ten degrees at 500 R. P. M.

Fig. 5 brings out clearly the reason for advancing the preliminary charge at a greater rate than the main charge, for it is desirable to continue the flame beyond inception point of the main spray ignition, and the preliminary fuel is preferably introduced early enough to compensate for the ignition lag having a constant time value.

In Fig. 7, the relation of the preliminary and main fuel injection is illustrated at an engine speed of 2,500 R. P. M., and it may be noted that the preliminary fuel injection shown at $C^{II}$ corresponds to an angular movement of ten degrees, while the main spray has been advanced to twenty degrees before top center and the preliminary to seventy degrees before top center.

If for any reason it is desired to continue the main fuel injection throughout a constant time interval rather than a constant angular interval, a trip mechanism similar to that used for the preliminary injection in Fig. 2 may also be incorporated in the main fuel injection. Under these conditions, the hatched areas D will be extended toward the right of Figs. 5, 6, and 7 as the speed is increased in the same manner as the length of hatched areas C, $C^I$, and $C^{II}$ are increased with an increase in engine speed.

In Fig. 8 the pressure characteristics of the present engine and the engines as heretobefore designed have been illustrated to show the desirability of decreasing the ignition lag which, according to the preferred embodiment, is accomplished by injecting the main spray through or adjacent to a preliminary created flaming mixture.

Fig. 8 is more easily understood by considering it in connection with Fig. 9, wherein the various crank movements have been plotted against piston displacement and illustrate the manner in which the compression pressures are produced by rotation of the engine crankshaft 136, which is connected to piston 12 by a connecting rod 137. The displacement diagram of Fig. 9 is plotted on the assumption that connecting rod 137 is of infinite length, and no correction is made for rod angularity, for deviation from this cause is very slight when drawn to the scale used and does not affect the principles involved.

In Fig. 8, solid line X represents the pressure of a conventional Diesel engine as operated with compression ignition, and solid line Z represents the pressure curve without the occurrence of ignition. In the operation of the ordinary Diesel engine, if for some reason ignition could be prevented, the upward movement of the piston would compress the fuel charge along the solid line Z to the dead center position, after which it would decrease in the same ratio to atmospheric pressure. In the normal operation of the engine with compression ignition, the pressure rises along the solid line X that coincides with line Z up to the point I, at which point the rise in pressure caused by the combustion of the fuel is apparent and curve X rises abruptly upward to substantially the dead center position, after which the gases expand and do work upon the piston head to force it downwardly. Because of the phenomenon of ignition lag, it is not possible to secure a pressure rise at I by introducing the fuel at this point, and it must be introduced at point H considerably in advance of point I, and under ordinary operating conditions there is no appreciable separation of the combustion curve from the compression curve until the fuel has been sufficiently ignited to cause the curves to separate at point I.

The fuel injection of the conventional Diesel engine is illustrated in Fig. 8 by the area underneath the line J and is shown as being initiated at forty-five degrees before top dead center and continuing until approximately dead center. The broken line Y illustrates the pressure curve which may be obtained by eliminating the ignition lag, and it may be noted that the maximum pressure may be much lower than the maximum pressure of the conventional engine, for the injection of fuel as flaming particles enables the combustion to take place over a more extended period, and although the maximum pressure is lower, the mean effective pressure, as illustrated by the area underneath the curve Y, is substantially the same as that of the conventional Diesel engine. The area underneath the broken line K represents the preliminary fuel injection which is shown as starting at approximately sixty degrees before top dead center and continuing for fifteen degrees. The same ignition lag as is present in the injection of the conventional charge J is also present in connection with the preliminary injection, but this need cause no concern as the preliminary charge is a very small proportion of the total charge and the flame created thereby continues up to the dead center position, which makes it possible to introduce the main spray represented by the area under line L with an advance of only fifteen degrees and to continue it for some time after top dead center.

It may be pointed out at this time that the inclusion of a glow plug is desirable, for it is assumed that the point H is the minimum pressure at which the heat is great enough to cause ignition, and if this be true, the ignition of the preliminary charge K will not occur until the fuel charge has been entirely injected, this being shown in the diagram as corresponding to point H. If a glow plug be used, the ignition may be instigated at any point in the preliminary fuel injection, and the pressure rise due to the combustion of the main fuel charge delayed by a subsequent injection, as shown by the more gradual slope of line Y. Attention is also called to the fact that in the conventional Diesel engine the pressure rise is very abrupt, and necessarily so because of ignition lag. The abrupt pressure rise of the conventional Diesel engine is known to be objectionable, but it is difficult to eliminate it, for with compression ignition the point H at which the fuel is introduced must correspond to a pressure high enough to cause ignition, and this point must be in advance of top dead center in order to prevent ignition lag from interfering with efficient combustion.

Figure 3:
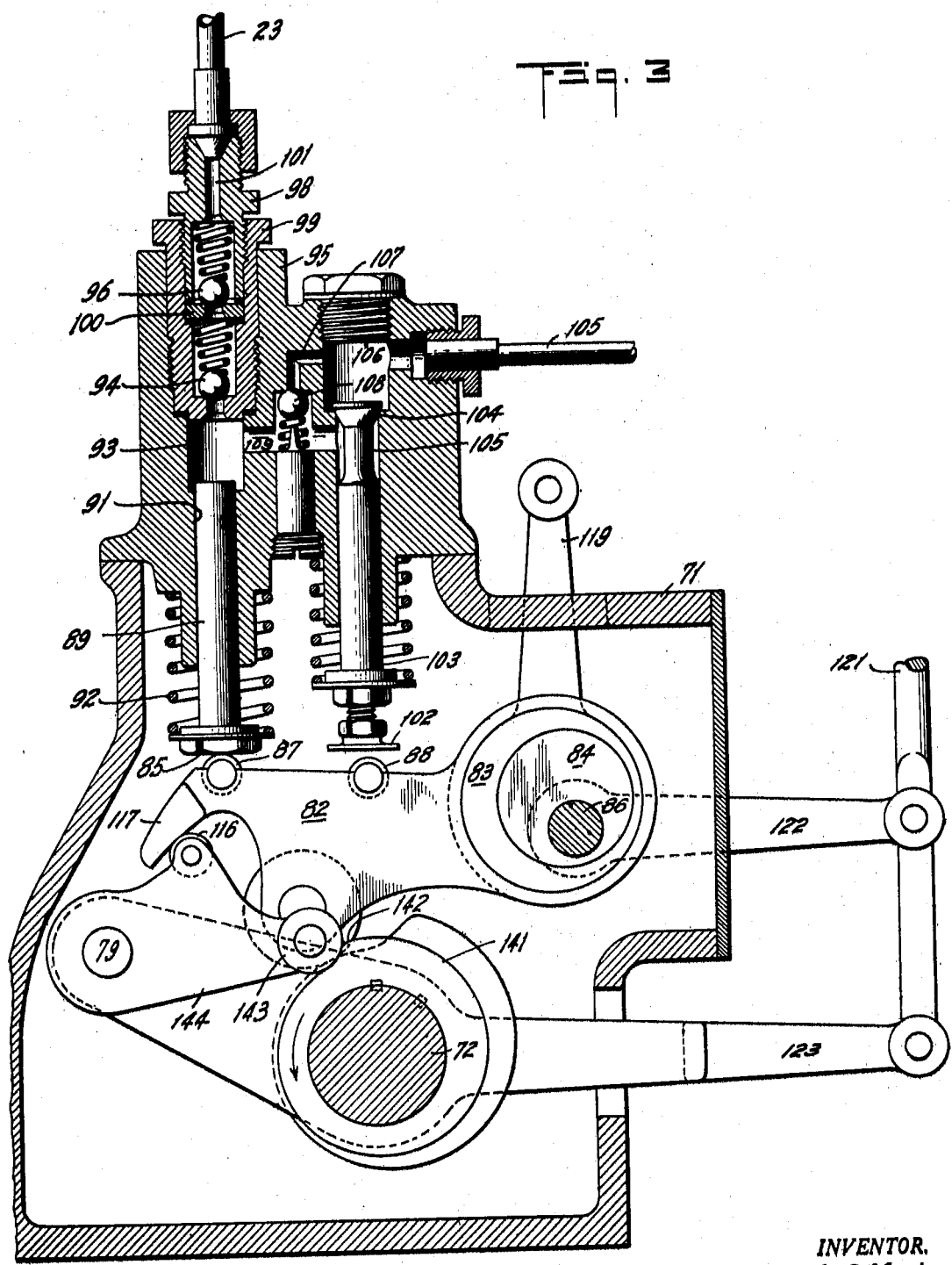
Fig. 3 is a sectional elevation of a somewhat different form of pump.

In Fig. 3 a somewhat simpler pump has been shown which, although of the same general construction as the pump illustrated in Fig. 2, has the preliminary injection produced by an engine rotating cam, and the preliminary spray extends over a constant angular interval instead of a constant time interval. In the pump illustrated, a second cam 141 actuates plunger 89 in an upward direction, and the time interval is determined by the shape of the nose 142, it being apparent that the duration of the injection is over a constant angular distance regardless of engine speed. Nose 142 contacts with roller 143 to rotate lever 144 in a counterclockwise direction and cause roller 116 to actuate plunger 89 through upward movement of arm 117. Both the main injection and the preliminary injection are advanced and retarded by rod 121, the preliminary injection being advanced at a greater rate than the main injection, as is the case with the pump shown in Fig. 2. If a cam nose is selected of such form as to produce a preliminary injection of ten degrees, the diagram corresponding to this pump will be the same as that illustrated in Fig. 7 at 2,500 R. P. M. of the engine, and at 500 R. P. M. of the engine the duration of preliminary injection will remain at ten degrees, but the relative position of the sprays will be illustrated by the relation of the cross hatched triangle F' to the main injection represented by D, as shown in Fig. 6.

Figure 4:
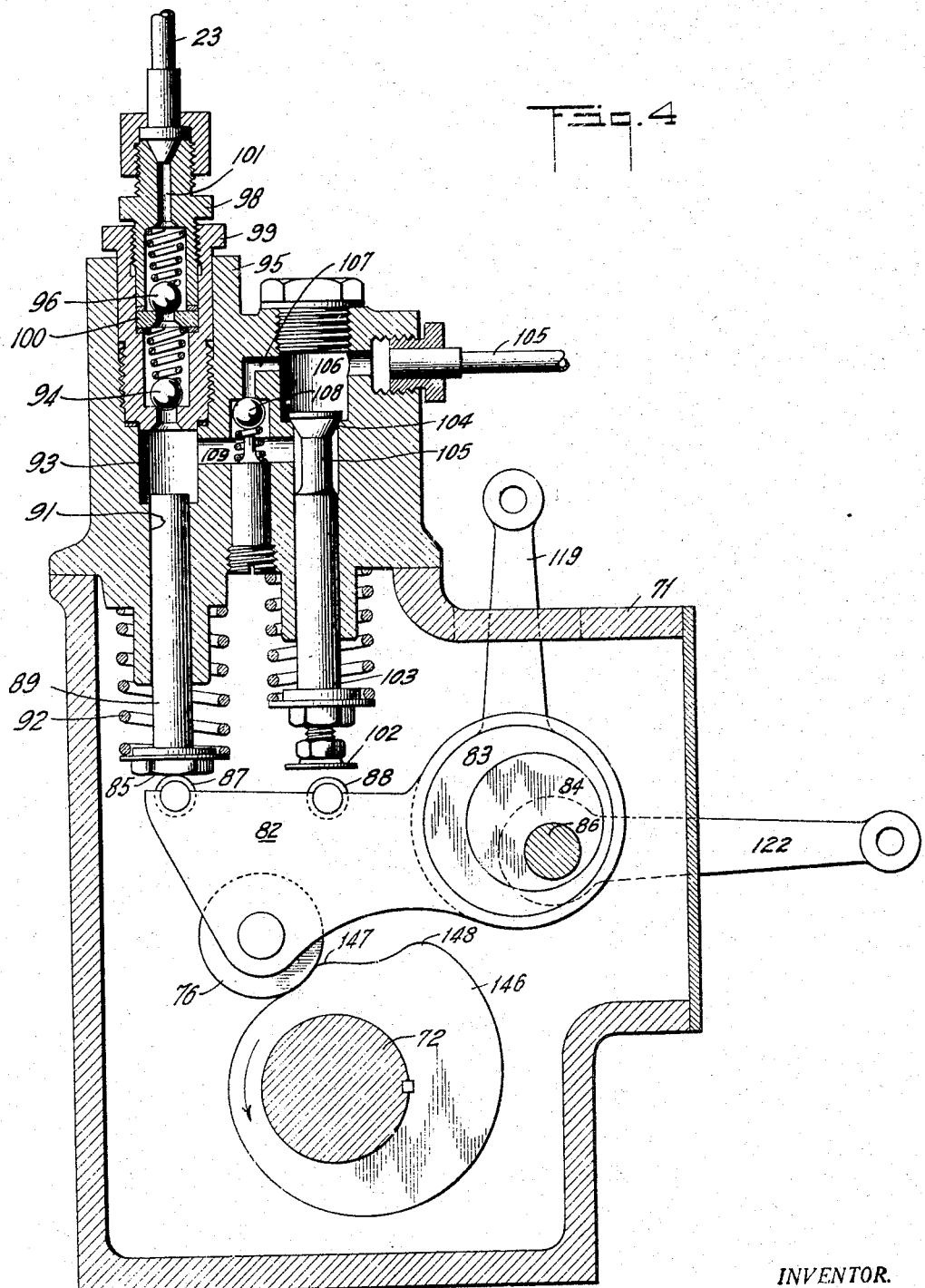
Fig. 4 is still another form of pump of somewhat simpler design adapted for use with a substantially constant speed engine.

In Fig. 4 a further form of the pump has been illustrated which is adapted to operate a constant speed engine. In this form of the invention, cam 146 has adjacent projections 147 and 148, both of which act on roller 76 to actuate the pump. Projection 147 produces the preliminary injection which is subsequently followed by the main spray produced by projection 148. In this form of the invention, the duration of the preliminary injection is over a constant angular interval, and both preliminary and main injections may be advanced or retarded by lever 122 which changes the relation of roller 76 with relation to projections 147 and 148, whereby an advance of the main spray for a predetermined amount advances the preliminary injection an identical amount. By a proper selection of cam projections, the diagrams may be made to correspond to any one of the Figures 5, 6, and 7, it being understood that when the timing of the spray is changed to correspond with the change in speed, there is no compensation for the ignition lag and that the pump illustrated in Fig. 4 is not as well suited to an engine having wide variations in speed as the pumps illustrated in Figs. 2 and 3.

In Figs. 10 and 11, the invention is shown as embodied in a sleeve valve engine having inlet manifold 151, exhaust manifold 152, and reciprocating sleeves 153 and 154, within which is the reciprocating piston 12. The combustion chamber 156 is defined by a removable head 157 preferably in the form of a frustrated cone and the top surface of piston 12. The air charge is drawn from inlet manifold 151 on the suction stroke of the piston and is directed into the expansion chamber 158 by a series of baffles 159 arranged in intake port 161 to direct the air in the direction of the arrows of Fig. 11, the air at the outside of the cylinder having the greatest velocity and the air at the center having the least velocity.

Assuming that flame has been created in chamber 35 by a preliminary injection of fuel, the main spray is projected into the combustion chamber 156 along the lines A—A whereby the fuel is injected as flaming particles that first intersect the more slowly moving air at the central portion of the cylinder and progressively intersect the whirling air at positions whereat the velocity is greater.

The general design of the sleeve valve engine is well known, and as the general operation of the sleeve forms no part of the present invention, it is sufficient to say that on the intake stroke, ports 163 and 164 are moved into alignment by eccentrics (not shown) and permit the air to be drawn into the expansion chamber through baffles 159, which give the charge the above described whirling motion which has been found to exert a beneficial influence on the fuel combustion.

In Figs. 12 to 17 inclusive, the invention has been illustrated as embodied in a valve-in-the-head engine having cylinder 171 within which reciprocates piston 12 to form an expansion chamber. In this form of the invention, the combustion chamber 172 is offset with respect to cylinder 171, as best shown in Figs. 15 and 17, and is also inclined at a slight angle with respect to the plane of the face of the piston 12. Combustion chamber head 173 is provided with semicircular depressions 174, which are preferably arranged in a series of spiral baffles 176. The piston 12 normally approaches the cylinder top wall 177 with a very slight clearance therebetween at the top of the piston stroke in order to displace practically all of the air within the cylinder on the compression stroke, and force it into the combustion chamber 172 in a manner to produce an air swirl therein in the direction of the arrows, as shown in Figs. 13 and 17. Inlet valve 178 preferably is located so as to have a very slight clearance with the upper face of piston 12, but exhaust valve 179 is given slightly more clearance and is located in a pocket 181 connected with the combustion chamber 172 by a restricted passageway 182. The fuel injector is constructed in substantially the same manner as that shown in the other embodiments, with the exception that the spiral flutes illustrated in Fig. 1 have been eliminated from the conical end of fuel valve 36, although if desired these may be also incorporated in the manner illustrated in Fig. 1.

In the operation of the engine, air is drawn in through intake port 184 on the down stroke of piston 12 and compressed on the upward stroke of the piston at approximately the dead center position. The remaining air is injected with considerable force in the direction of the arrows, as shown in Fig. 17, into the passage 182 and from which it is forced tangentially into the combustion chamber 172 to produce an air swirl therein, which continues for some little time after the termination of the compression stroke. The whirling air, after its entry into the combustion chamber, is redirected by side wall 186 toward the semicircular depressions 174, wherein the whirling air is directed toward the core of the swirl by the baffles 176. In this form of the invention, flame chamber 35 and fuel injection valve 36 are displaced slightly from the axis of the combustion chamber 172 in order to direct the main fuel charge to one side of the combustion chamber axis. This arrangement of the fuel injector and flame chamber permits one side of the fuel cone defined by the lines A—A to be injected through the more rapidly moving air particles adjacent the wall of the combustion chamber and the other side of the fuel cone to be directed through the more slowly moving air particles at the interior of the combustion chamber. This arrangement has been found to be very desirable under certain conditions, for the fuel intersecting the more rapidly whirling air is brought into intimate contact with a large amount of air and the danger of incomplete combustion is obviated, for if by chance the flame of the ignited particles be extinguished, it will be immediately reestablished by the particles which are injected into the more slowly moving core and which are in no danger of being cooled at a rate that will destroy the flame. In this form of the invention, the combustion chamber is also preferably surrounded by a cooling chamber 187 containing a fusible salt having a sufficiently high boiling point to increase the temperature of the flame chamber above that of the combustion chamber, and which cooling chamber may be connected by means of opening 188 to a heat exchanger similar to that illustrated in Fig. 1.

While certain embodiments of the invention have been illustrated and described, it is understood that the injection of fuel in coordinated successive steps may be used with other types of combustion chambers with beneficial results and various changes may be made without departing from the spirit and scope of the invention, and that the invention is not regarded as limited to the form illustrated and described, or otherwise, except by the terms of the following claims.

What is claimed is:

1. In an internal combustion engine having a flame chamber and a combustion chamber, means for injecting a preliminary fuel charge into the flame chamber, means for igniting the preliminary charge prior to injection of an additional charge, and means for injecting an additional fuel charge through the burning preliminary mixture in the flame chamber into the combustion chamber.

2. In an internal combustion engine having a flame chamber and a combustion chamber, means for injecting a preliminary fuel charge into the flame chamber, means for immediately igniting the preliminary charge, means for injecting an additional fuel charge through the burning preliminary mixture in the flame chamber into the combustion chamber, and means for differentially varying the beginning of the two injections.

3. In an internal combustion engine having a flame chamber, a combustion chamber, and an expansion chamber, means for injecting a preliminary fuel charge into the flame chamber and immediately igniting the same therein, means for subsequently injecting a second fuel charge through the burning preliminary charge into the combustion chamber, said combustion chamber being in communication with the expansion chamber.

4. In an internal combustion engine having a flame chamber, a combustion chamber, and an expansion chamber, means for creating an air swirl in the combustion chamber, means for injecting a preliminary fuel charge into the flame chamber, means for immediately igniting the charge therein, means for subsequently injecting a second fuel charge through the burning preliminary charge and into the air swirl of the combustion chamber, said combustion chamber having an opening communicating with the expansion chamber.

5. In an internal combustion engine having a flame chamber, a combustion chamber, and an expansion chamber having an opening in communication with the combustion chamber, means for injecting a preliminary fuel charge into the flame chamber, means for immediately igniting the charge therein, means for subsequently injecting a second fuel charge through the burning preliminary charge into the combustion chamber and toward the opening between the combustion chamber and expansion chamber.

6. In an internal combustion engine having a cylinder and a piston reciprocating therein to provide an expansion chamber, a combustion chamber in communication with the expansion chamber, means for producing a swirl of air in the combustion chamber as the piston approaches its upper dead center, a flame chamber, means for igniting fuel in the flame chamber, means for injecting a pilot spray of fuel toward the igniting means to immediately ignite the spray, and means for subsequently injecting fuel through the burning pilot spray and across the air swirl in the combustion chamber.

7. In an internal combustion engine having a cylinder and a piston reciprocating therein to provide an expansion chamber, a combustion chamber, a flame chamber, said three chambers being in series and having aligned openings, means for producing an air swirl in the combustion chamber on the compression stroke of the piston, means for igniting fuel in the flame chamber, means for directing a pilot spray of fuel toward the igniting means to immediately ignite the fuel, means for subsequently directing a main fuel spray through the burning spray in the flame chamber through the aligned openings and through the air swirl into the expansion chamber, and means for shielding the flame chamber from the air swirl.

8. In an internal combustion engine having a cylinder and a piston forming an expansion chamber, a combustion chamber having an opening into the expansion chamber, a flame chamber having an opening into the combustion chamber opposite to the piston, said flame chamber being smaller than the combustion chamber, the combined capacities of both last named chambers constituting substantially all of the clearance space at the piston dead center, means for injecting a preliminary fuel charge in the flame chamber, means for producing immediate ignition of a portion of the fuel in the flame chamber, means for producing an air swirl in the combustion chamber, and means for subsequently injecting a main fuel spray into the flame chamber and through the burning fuel therein and across the air swirl in the combustion chamber toward the opening in the expansion chamber.

9. In an internal combustion engine having a cylinder and a piston reciprocating therein to provide an expansion chamber, a combustion chamber in communication therewith, means for producing an air swirl in the combustion chamber, a flame chamber, an ignition device therein, means for injecting a fuel pilot spray toward the ignition device to ignite the spray, means for subsequently injecting a main fuel spray through the burning fuel spray in the flame chamber and into the air swirl, and means for changing the beginning of injection of both sprays at different rates.

10. In an internal combustion engine having a cylinder and a piston reciprocating therein to provide an expansion chamber, a combustion chamber in communication therewith, means for producing an air swirl in the combustion chamber, a flame chamber, an ignition device therein, means for injecting a fuel pilot spray toward the ignition device to ignite the spray, means for subsequently injecting a main fuel spray through the burning fuel spray in the flame chamber and into the air swirl, and means for changing the beginning of injection of both sprays at different rates, said pilot spray having a higher rate of change than the main spray.

11. In an internal combustion engine having a cylinder and a piston reciprocating therein to provide an expansion chamber, a combustion chamber in communication therewith, means for producing an air swirl in the combustion chamber, a flame chamber, an ignition device therein, means for injecting a pilot fuel spray toward the ignition device to ignite the spray, means for subsequently injecting a main fuel spray through the burning fuel spray in the flame chamber and into the air whirl, and means for simultaneously changing the beginning of injection of both sprays at different rates.

12. In an internal combustion engine having a cylinder and a piston reciprocating therein to provide an expansion chamber, a combustion chamber in communication therewith, means for producing an air swirl in the combustion chamber, a flame chamber, an ignition device therein, means for injecting a pilot fuel spray toward the ignition device to ignite the spray, means for subsequently injecting a main fuel spray through the burning fuel spray in the flame chamber and into the air whirl, and means for simultaneously changing the beginning of injection of both sprays at different rates, said pilot spray having a change rate of more than twice the value of the main spray rate.

13. In an internal combustion engine having a flame chamber, a combustion chamber aligned therewith, means on the piston cooperating with the chamber walls for injecting a cylinder of air into the chamber and creating an air swirl therein having its greatest velocity adjacent the chamber walls, means for injecting a preliminary fuel charge into the flame chamber, means for immediately igniting the same, and means for subsequently injecting a main spray through the burning fuel in the flame chamber into the combustion chamber and across the air swirl in a direction to first intersect the outer portion of the air swirl then to intersect the central portion and later to intersect the outer portion.

FRANK C. MOCK.